3,481,610
SEAL VALVE ASSEMBLY
Damon T. Slator and Albert L. Burns, Jr., Houston, Tex., assignors to Bowen Tools, Inc., a corporation of Texas
Filed June 2, 1967, Ser. No. 643,217
Int. Cl. F16j 15/46; F16k 41/00; F16l 33/16
U.S. Cl. 277—34.6                                                      1 Claim

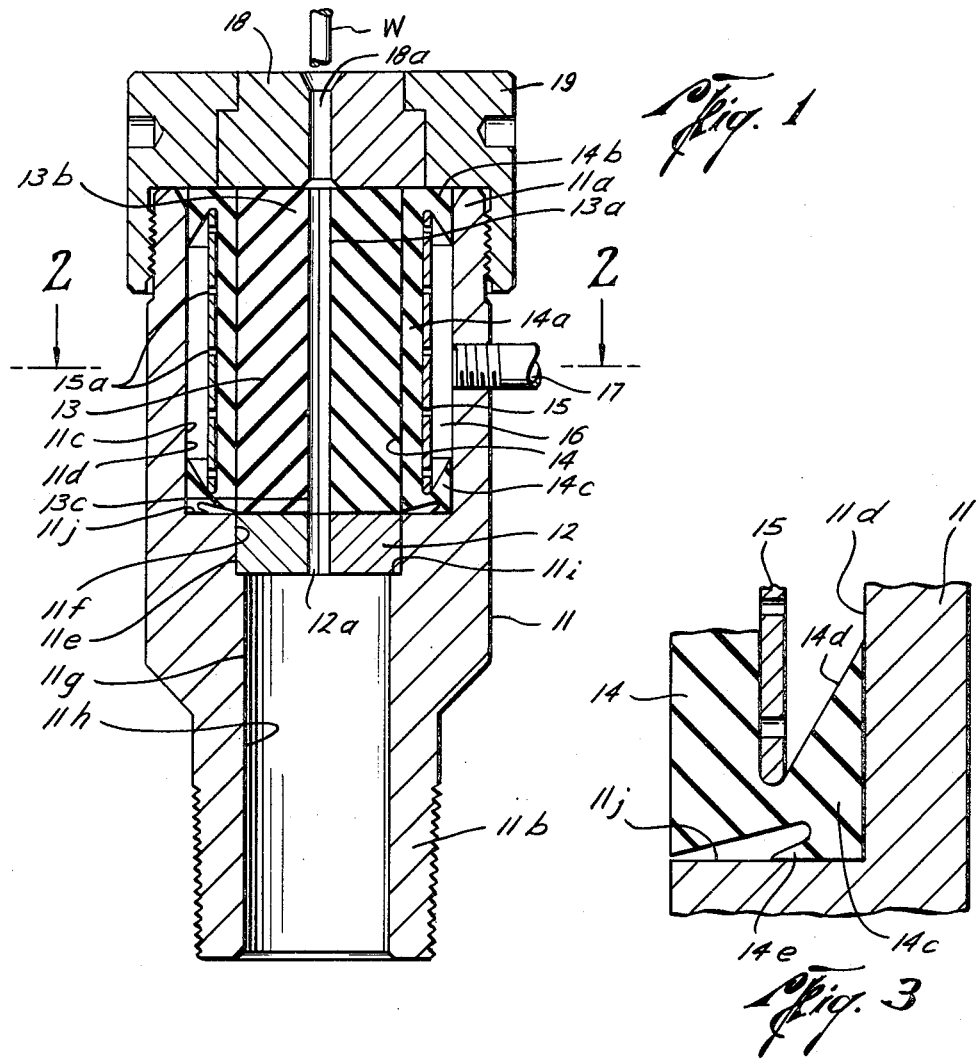
Fig. 1
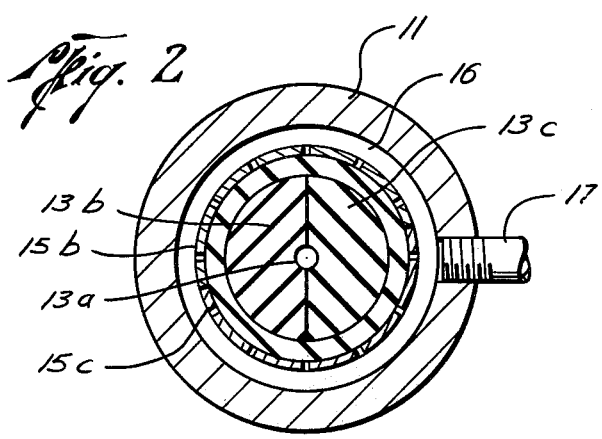
Fig. 2
Fig. 3
Damon T. Slator
Albert L. Burns, Jr.
INVENTORS
BY Hayden & Pravel
ATTORNEYS Dec. 2, 1969   D. T. SLATOR ET AL   3,481,610
SEAL VALVE ASSEMBLY
Filed June 2, 1967   2 Sheets-Sheet 2
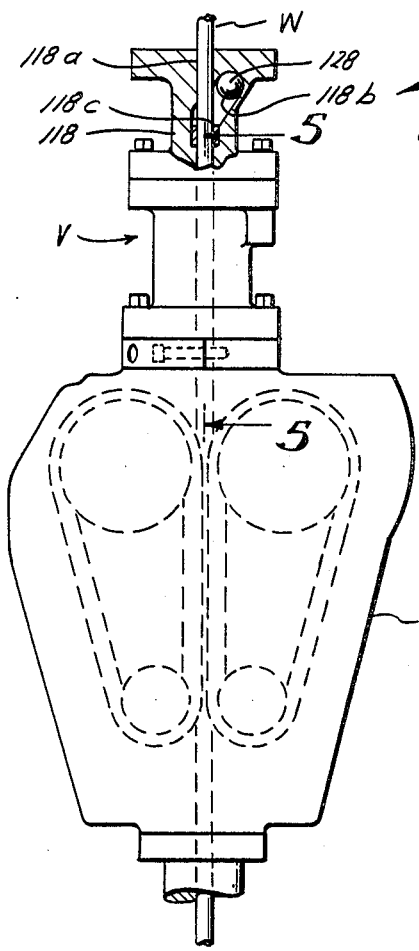
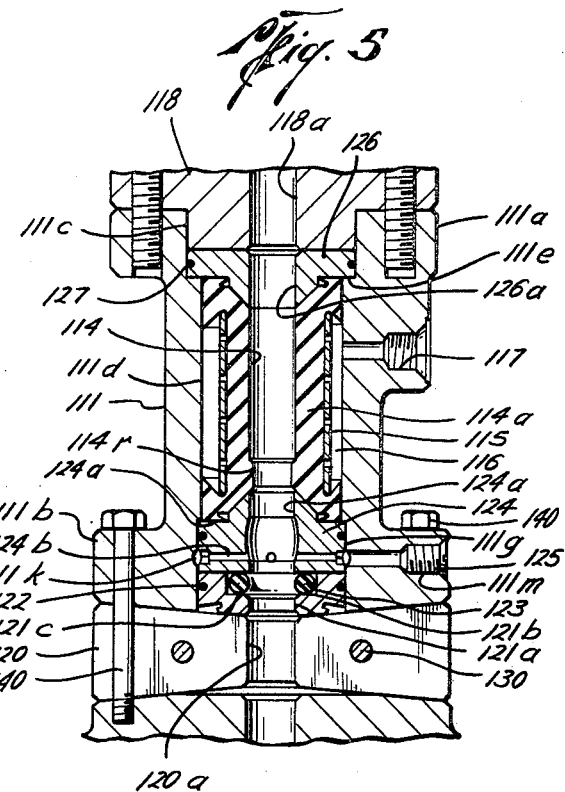
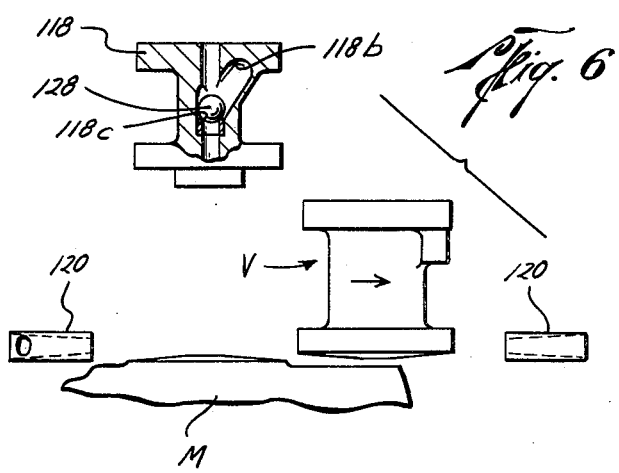
Damon T. Slator
Albert L. Burns, Jr.
INVENTORS
BY Hayden & Pravel
ATTORNEYS United States Patent Office 3,481,610
Patented Dec. 2, 1969

ABSTRACT OF THE DISCLOSURE

A seal valve assembly having a chamber extending axially through a barrier between two different pressure zones with an elastic sealing assembly coaxially surrounding a wireline rod, submarine antenna, or other elongate element for effecting sealing contact with the elongate element when the chamber is pressurized to maintain the pressure differential between the two pressure zones while the elongate element moves through the barrier.

BACKGROUND OF THE INVENTION

The invention relates generally to the field of valves and specifically to valves for effecting a seal about a wireline, rod, submarine antenna, or other elongate element moving between a first pressure area and a second different pressure area. The invention is useful, for example, in feeding a floating antenna line from a submarine or other submerged vessel whereby the seal formed against the moving line prevents the external, high pressure water from entering the internal, low pressure area within the vessel. By way of further example, the invention is also applicable to oil well devices for maintaining a seal between a moving rod or wireline and the high and low pressure areas through which the line or rod moves.

SUMMARY OF THE INVENTION

In its preferred form, the valve assembly comprises a rigid, external tubular body which surrounds a flexible spool to form an annular chamber. The body of the spool carries a rigid tubular sleeve with perforations in its walls. The spool surrounds a resilient, cylindrical wiping member which in turn closely surrounds a movable wireline or other elongate element extending through the center of the assembly.

The axial ends of the flexible spool are confined against lateral movement in the external tubular body. The annular chamber is supplied with hydraulic or other fluid through a supply line opening through the wall of the external tubular body. When the fluid within the chamber is pressurized, it communicates with the flexible spool through the perforations in the reinforcing sleeve causing the spool to exert pressure against the resilient cylindrical member which in turn effects a seal with the moving wireline or other elongate element. A perforated sleeve is disposed so as to co-act with the ends of the resilient cylindrical member to prevent such member from distorting longitudinally and drawing away from the elongate element as the hydraulic pressure increases. The flanges of the flexible spool are designed to bear against both the inner wall of the external tubular body and the lateral surfaces with greater force as the pressure from within the chamber or from the external high pressure area increases, thus insuring an effective and controlled seal.

Because of the control which is possible with the present invention, through control of the hydraulic or fluid pressure supplied thereto, a controlled amount of leakage through the bore of the seal assembly and around the elongate element may be provided for lubrication and/or cooling, if desired.

It is thus an object of the present invention to provide a new and improved valve which forms an effective seal with a moving wireline or other elongate element.

BRIEF DESCRIPTION OF THE DRAWINGS

FIG. 1 is a vertical sectional view of the preferred form of the valve assembly of the present invention;

FIG. 2 is a cross-sectional view taken along the line 2—2 of FIG. 1;

FIG. 3 is an enlarged view of a portion of FIG. 1 illustrating certain details of the valve assembly of the present invention;

FIG. 4 is an elevation of a second form of the valve assembly of the present invention illustrated in combination with a typical feed mechanism used therewith;

FIG. 5 is a vertical sectional view taken along the line 5—5 of FIG. 4 illustrating the structure of the second form of the valve assembly of the present invention; and FIG. 6 is a partial elevation of the second form of the valve assembly of the present invention illustrating certain assembly and disassembly features.

DESCRIPTION OF THE PREFERRED EMBODIMENTS

The valve assembly illustrated in FIGS. 1, 2, and 3 of the drawings comprises an outer body or housing 11 of cast iron or other suitable material with first and second threaded ends 11a and 11b. A large diameter bore 11c with a cylindrical wall 11d extends along a portion of the central axis of the housing body 11. A second bore 11e having a cylindrical wall 11f extends from the first bore 11c to a third bore 11g having a cylindrical wall 11h. The bores 11g and 11e meet to form a shoulder 11i. A second shoulder 11j is formed at the junction of the bore 11e and the bore 11c.

A split metal bushing 12 of brass or other suitable material rests on the shoulder 11i and supports a resilient, cylindrical wiping member 13 constructed of rubber or other suitable elastic resilient material. The wiping member 13 has an axial bore or central opening 13a which is longitudinally aligned with a central opening 12a in the split bushing 12. The diameter of the bore 13a preferably approximates the diameter of the wireline W or other elongate element illustrated above the valve assembly in FIG. 1 of the drawings, although such bore 13a may be larger or smaller than the elongate element so long as the elongate element can be inserted therethrough and a seal can be effected as will be explained.

The wiping member 13 is surrounded by a flexible bladder or spool 14 constructed of rubber or other suitable resilient elastic material with a cylindrical body portion 14a and lateral end flanges 14b and 14c. The body 14a of the spool 14 is enclosed within a rigid, cylindrical reinforcing sleeve 15 of steel or other suitable material. The walls of the sleeve 15 are provided with multiple perforations 15a. The space between the sleeve 15 and the spool flanges 14b and 14c defines a fluid chamber 16 which is adapted to receive fluid pressure for squeezing the bladder 14 inwardly to reduce the diameter of the bore 13a for sealing with the elongate element W. A supply line 17 communicates with the chamber 16 through an opening in the body 11.

A second bushing 18 of brass or other suitable material is positioned above the cylindrical wiping member 13 and is provided with a central bore 18a which registers with the wiper bore 13. A metal packing nut 19 engages and confines the metal bushing 18. The threads of the packing nut 19 engage co-operating threads formed on the end 11a of the housing body 11. Appropriately dimensioned bores 19a are formed in the packing nut 19 to accommodate a spanner wrench to be used in assembling the packing nut 19 and body 11.

As illustrated in FIG. 2 of the drawings, the cylindrical wiping member 13 is preferably composed of two semi-cylindrical segments 13b and 13c. The perforated sleeve 15 is similarly preferably composed of two co-operating segments 15b and 15c. Although only two segments are illustrated for simplicity, the member 13 and the sleeve 15 may be formed into any desired number of component parts. The segmented construction of the wiping member 13 and the sleeve 15 permits assembly and disassembly of the valve without necessitating removal of the wireline W. Thus, disassembly of the valve is accomplished by first removing the packing nut 19. The packing nut 19 and bushing 18 are then lifted along the wireline W so that the plural part wiping member 13 may be lifted out of the spool shaped bladder 14.

FIG. 3 of the drawings illustrates the co-operation of the sleeve 15 and the bladder 14 as well as certain details in the shape of the flange 14c. The flange 14c is seen to include a first lip 14d engaging the wall 11d and a second lip 14e engaging the shoulder 11j. The design of the lips 14d and 14e forces the lips to bear against their restraining walls with increasing force as the pressure acting against these lips increases. As can be readily seen from FIGS. 1 and 3, the lip 14e is exposed to pressure within the bore 13e of the wiper 13. Similar lips may be provided on the upper flange 14b if desired. The annular lips 14d also act to form a pocket to confine the sleeve 15 radially and axially.

In the operation of the valve assembly of the present invention, the wireline W or other elongate element moves through separate pressure areas via the continuous longitudinal opening formed by the longitudinally aligned bores 18a, 13a, and 12a.

Pressurized hydraulic fluid or other fluid is supplied to the annular chamber 16 through the supply line 17. As the pressure of the fluid is increased, the size of the chamber 16 increases by distending the bladder 14. The ends of the bladder 14 are held against axial movement by the sleeve 15 so that inward distention of the bladder 14 results in an inward substantially radial compression which tends to reduce the diameter of the wiper bore 13a. As the pressure in the fluid chamber 16 increases, the diameter of the bore 13a decreases causing the wiper 13 to more firmly engage the moving elongate element W. Continued increase of the pressure within the chamber 16 tends to decrease the diameter of the wiper bore 13a which would cause it to pull away from the element W at the end points 13b and 13c, but for the perforated sleeve 15 which prevents this action and thereby insures contact between the wiper 13 and the wireline W along the entire length of the bore 13a. Also, the sleeve 15 maintains the lower lip seal provided by the annular lip 14e in sealing contact with the surface 11j as the fluid pressure in the chamber 16 increases so that there is no blow by or loss of pressure at that point. It should be noted that when the wireline W is not in the bore 13a, the wiper bore 13a can be completely closed if desired to close off fluid flow therethrough.

FIGS. 4, 5, and 6 of the drawings illustrate a second embodiment of the valve assembly of the present invention. In FIG. 4 of the drawings, a valve assembly designated generally as V is illustrated in position above a feed mechanism M. The feed mechanism M is only schematically shown since it is of known construction as shown in United States Patent No. 3,285,485 and is here employed in feeding the wireline or other elongate element W. The mechanism M is merely illustrative and does not restrict the ambit of use of the valve assembly V.

The valve assembly V, illustrated in detail in FIG. 5 of the drawings, includes a rigid outer body 111 with end flanges 111a and 111b. The body 111 is provided with a first large diameter bore 111c which joins a smaller diameter, concentric bore 111d along a shoulder 111e. The bore 111d extends to a larger diameter bore 111g.

A metal locking wedge 120 is positioned between the valve assembly V and the feed mechanism M. The axial end surfaces of the locking wedge 120 are concave to conform with the mating convex surfaces of the body flange 111b and the mounting surface of the mechanism M. The locking wedge 120, which is formed in two segments, has a central opening 120a having a diameter larger than the diameter of the wireline W. Two tie-bolts 130 hold the two segments of the locking wedge 120 together. The reduced diameter at the threaded ends of the oppositely faced bolts 130 produces the cross-sections of different diameters illustrated in FIG. 5 of the drawings. The valve assembly V, locking wedge 120, and mechanism M are secured by several mounting bolts 140.

An O-ring retainer 121 is positioned adjacent the upper surface of the locking wedge 120 and within the confines of the bore 111g. The outer surface of the O-ring retainer 121 is provided with a circumferential channel which carries a resilient O-ring 122 of rubber or similar material. A central bore 121a which has a diameter larger than the diameter of the wireline W is provided in the retainer 121. A second, concentric bore 121b formed in the retainer 121 meets the bore 121a along a shoulder 121c. The bore 121b and the shoulder 121c co-operate to form a pocket which retains a large resilient O-ring 123.

A seating bushing 124 of brass or other suitable material is carried above the retainer 121. The outer cylindrical surface of the bushing 124 is provided with a groove which carries a resilient O-ring 125. A central bore 124a in the bushing 124 is formed with an increased diameter along a portion of its length. Several small diameter lateral bores 124b in the bushing 124 connect the increased diameter portion of the bore 124a with an annular channel 111k formed along the wall of the bore 111g. The channel 111k connects with a threaded bilge drain port 111m formed through the body flange 111b. A removable plug 25 engages co-operating threads in the drain port 111m.

A spool-shaped bladder and wiping element 114 seats against the upper surface of the bushing 124. The body portion 114a of the bladder 114 is enclosed within a plural part, rigid reinforcing sleeve 115. Several perforations 115a are formed in the wall of the sleeve 115. The end flanges 114b and 114c of the bladder 114 are provided with lips similar to the lips illustrated in FIG. 3 of the drawings.

A retaining bushing 126 is seated above the bladder 114. The outer cylindrical surface of the bushing 126 is provided with a circular channel which carries a resilient O-ring 127. A central bore 126a having a diameter larger than the diameter of the wireline W is formed in the bushing 126. A ball check valve 118, having a central bore 118a, is secured to the flange 111a of the body 111 by bolts 127.

The fluid under pressure is supplied through a port 117 communicating with the expansion chamber 116 through the wall of the body 111.

The basic operation of the valve assembly V is similar to that of the embodiment illustrated in FIGS. 1, 2, and 3 of the drawings. The structure differs from that of the embodiment of FIG. 1 in that the wiper element of the valve assembly V of FIG. 5 is the bladder 114 itself. Moreover, the central opening of the bladder 114 is preferably provided with a reduced section 114r having a diameter corresponding to the diameter of the wireline W. The diameter of the remainder of the central opening in the bladder 114 is thus slightly larger than the diameter of the wireline W.

The modification of FIG. 5 is particularly suited for operation between low pressure differentials. In such applications, the area of sealing contact afforded by the reduced diameter portion 114n against the wireline W is sufficient to prevent leakage. The reduction in contact area produces a corresponding reduction in friction heating caused by the movement of the wireline W through the wiper 114.

The construction of the valve assembly V also facilitates easy adjustment to permit a small amount of external fluid from the high pressure area to seep or leak between the elongate element W and the surface of the wiping section 114r. Such leakage of fluid through the path described is carefully controlled to a minimum amount so as to maintain the control of the pressure on such side of the seal assembly V, while carrying away some or all of the heat generated by the wiping action of the element W as it passes through the valve V.

The central opening of the bladder 114 may be completely closed by sufficiently pressurizing the chamber 116 when the elongate element W is removed. This affords one means for preventing leakage through the opening left by the removal of the element W. The ball check valve 118 mounted on the valve assembly V is a second means for preventing such leakage. The valve 118 includes a central bore 118a having a diameter which is preferably slightly larger than the diameter of the element W. A cavity 118b is formed within the body of the valve 118 and opens into the bore 118a. A spherical ball 128 is contained within the cavity 118b.

When the element W is removed from the valve assembly V, the ball 128 is free to fall into a seat 118c formed in the bore 118a. When the element W is fed upwardly through the valve assembly V, the leading end of the element W forces the ball 128 back into the cavity 118b.

FIG. 6 of the drawings illustrates certain features in the installation and removal of the valve assembly V into and away from co-operating structures. Where the distance between the ball valve 118 and the mounting surface of the mechanism M is fixed, removal of the valve assembly V is effected by first removing the mounting bolts 140 and 127. The tie-bolts 130 are then removed to disengage the semicircular components of the locking wedge 120. The wedge 120 may then be removed as illustrated in FIG. 6 of the drawings. When the valve assembly V has been removed, repairs or replacement may be easily effected. Reassembly of the valve V between the ball valve 118 and the mechanism M is accomplished by positioning the valve V below the valve 118 and then replacing the locking wedge 120 and the bolts 130, 140, and 127. When the tie-bolts 130 are tightened, they draw the semicircular components of the locking wedge 120 together whereby the wedge shape of the locking wedge 120 forces the valve V tightly against the valve 118. Thus, the parts of the seal assembly or valve V, such as the bladder 114, which require replacement or repair, may be easily removed in the field without removal of the feed mechanism M.

The foregoing disclosure and description of the invention are illustrative and explanatory thereof, and various changes in the size, shape, and materials as well as in the details of the illustrated construction may be made within the scope of the appended claims without departing from the spirit of the invention. For example, the fluid chamber of each of the several embodiments may be pressurized with gas rather than liquid or the shape of the distendable bladder may be altered to assume any number of desired configurations. Also, the sleeve 15 may be formed as a complete or partial cylinder or in segments so long as it functions in combination with the bladder 14 or 114 to maintain an effective seal.

We claim:

1. A seal valve assembly for sealing the external surface of an elongate element movable therethrough, comprising:
    (a) an outer housing body having a longitudinally extending cylindrical wall and a lower lateral shoulder therein;
    (b) an elastic spool having an upper annular lateral flange and a lower annular lateral flange and disposed within said outer housing body and spaced therefrom to define a closed chamber;
    (c) said spool having an axial bore extending through the central body portion thereof;
    (d) a rigid perforated sleeve which is substantially cylindrical throughout its length and having an upper end and a lower end and which sleeve is entirely spaced inwardly from the cylindrical wall and is confined between said upper and lower lateral flanges in sealing contact with said housing body when fluid pressure is introduced into said chamber;
    (e) means for introducing pressure fluid into said closed chamber for compressing said spool to reduce the diameter of said axial bore;
    (f) said upper flange having an annular downwardly depending lip which forms an upper annular pocket for receiving the upper end of said rigid sleeve;
    (g) said lower flange having an annular upwardly extending lip which forms a lower annular pocket for receiving the lower end of said rigid sleeve;
    (h) an annular lower lip on the lower annular surface of said elastic spool in engagement with said lower lateral shoulder of said housing body; and
    (i) said annular lower lip forming an annular pocket opening inwardly towards said axial bore of said elastic spool for increasing the effective sealing action between said annular lower lip and said shoulder due to fluid pressure in said bore or therebelow.

References Cited
UNITED STATES PATENTS

| | | | |
|---|---|---|---|
| 1,704,152 | 3/1929 | Stephens | 166—83 |
| 2,600,848 | 6/1952 | Collins | 166—82 |
| 3,207,221 | 9/1965 | Cochran | 251—1 |
| 3,239,100 | 3/1966 | Peterson | 251—5 |

WILLIAM F. O'DEA, Primary Examiner

HOWARD M. COHN, Assistant Examiner

U.S. Cl. X.R.

137—614.2; 166—77; 251—5